Figure 1A:
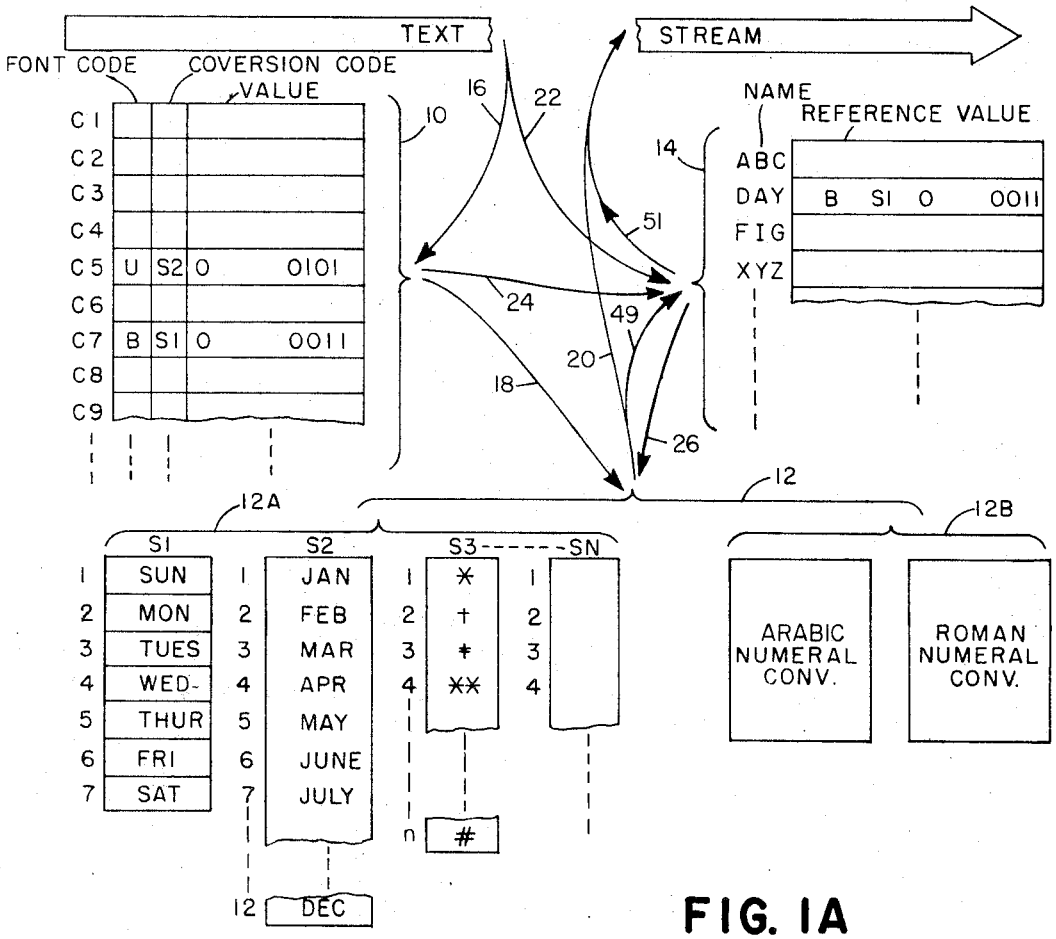
Figure 1B:
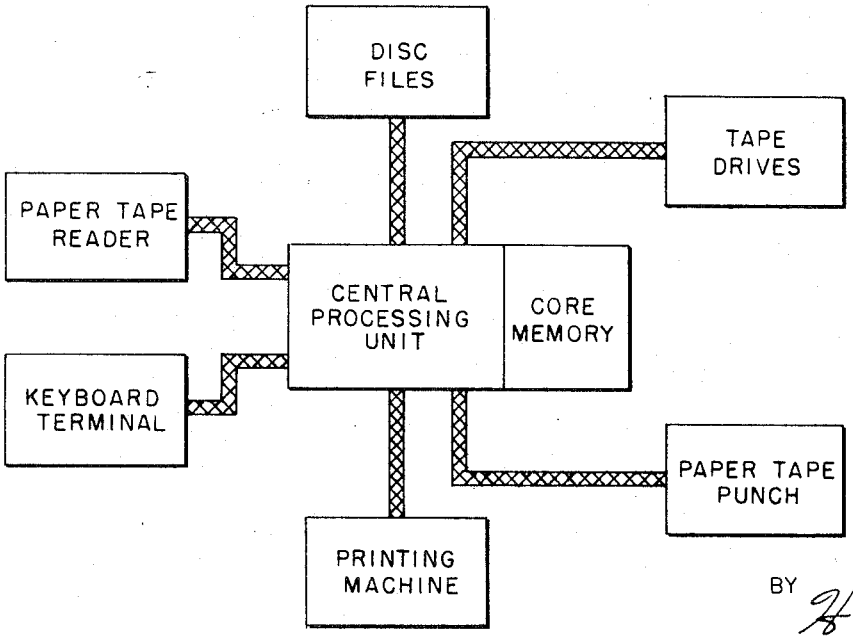
Figure 2A:
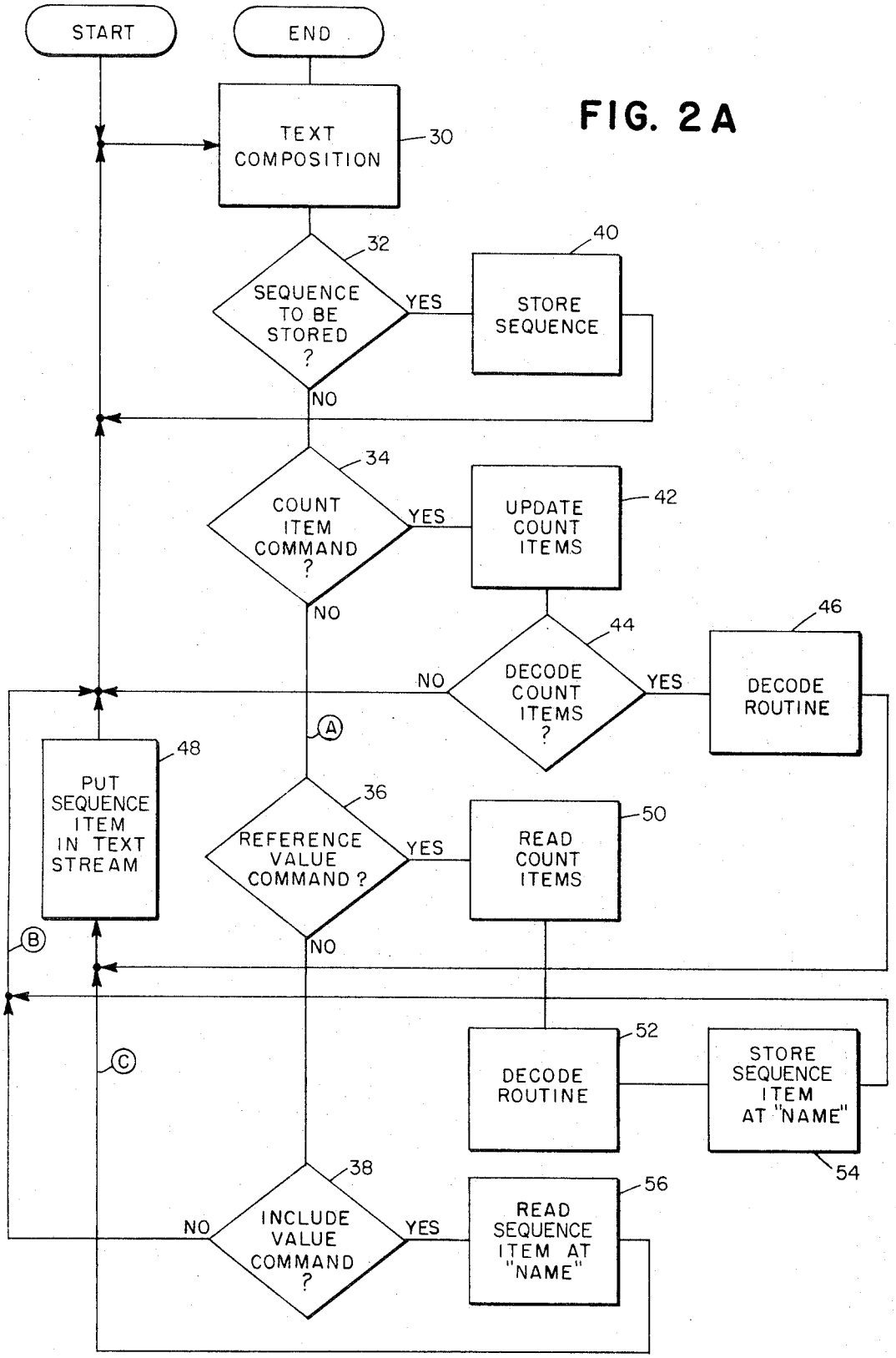
Figures 2B, 3:
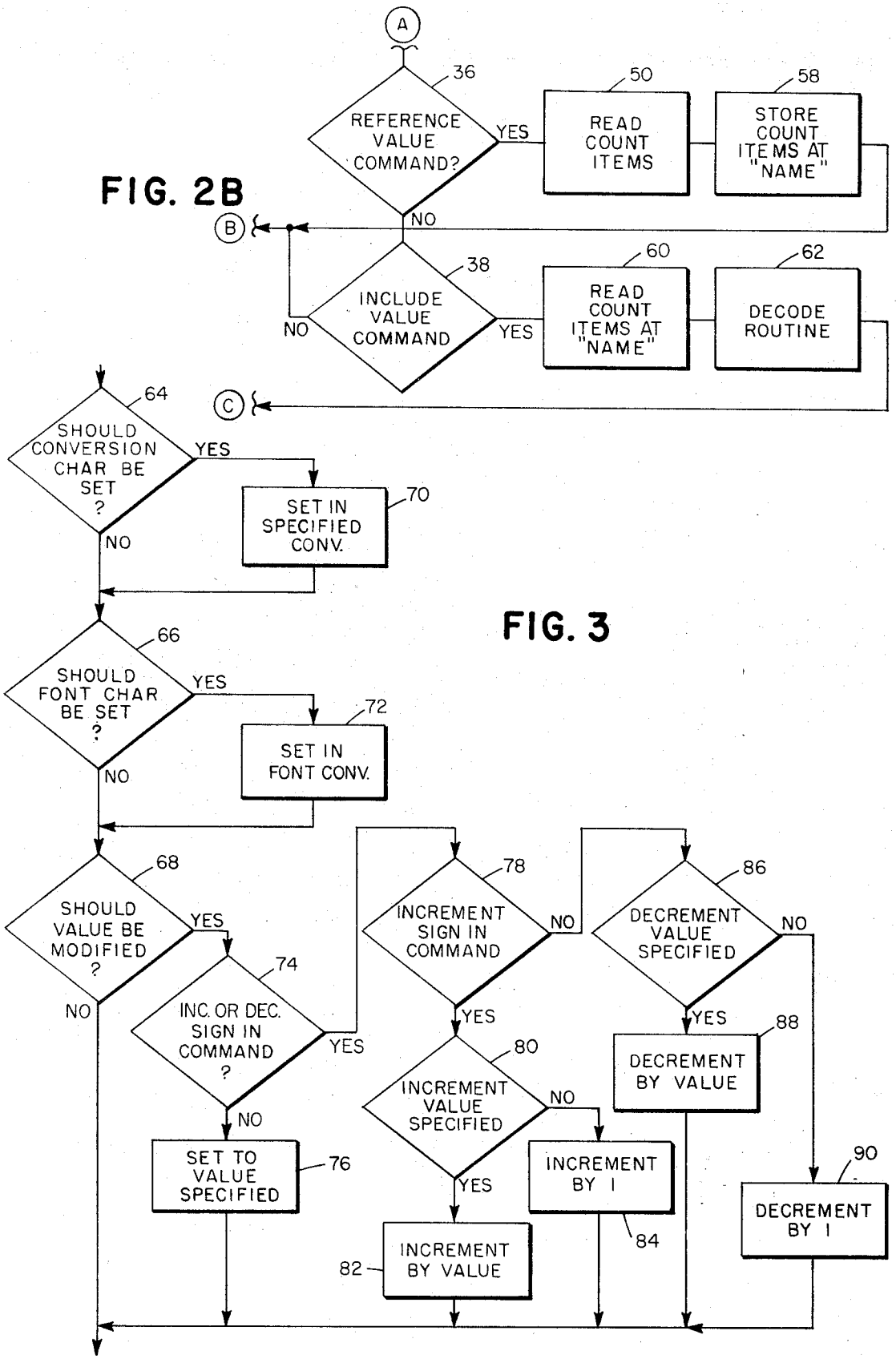
Figure 4:
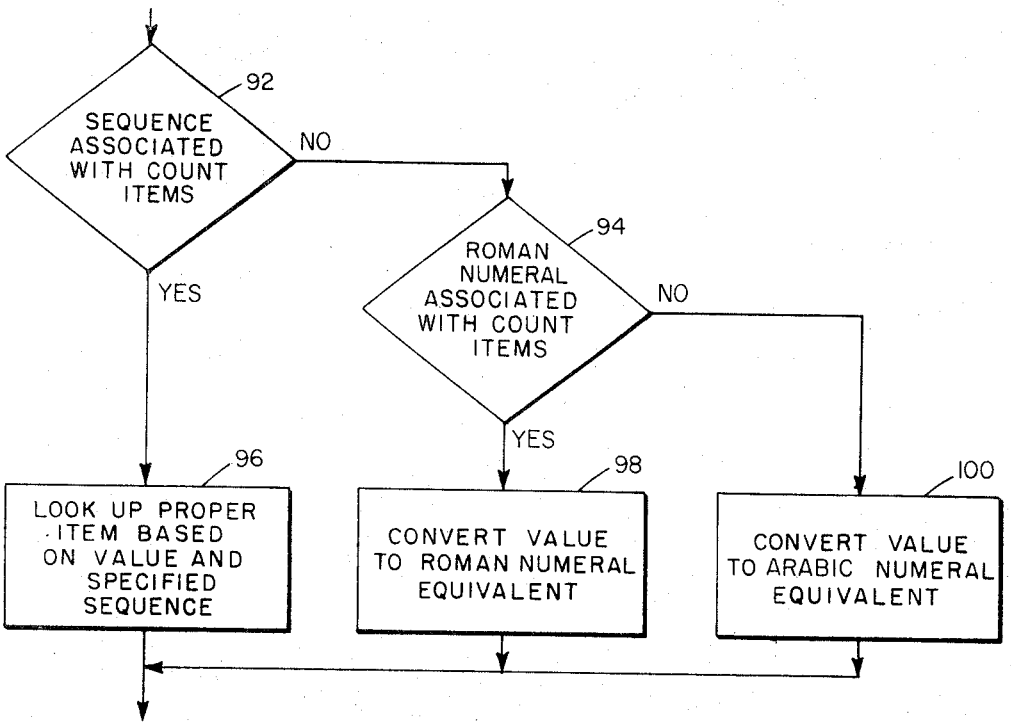
Figure 5:
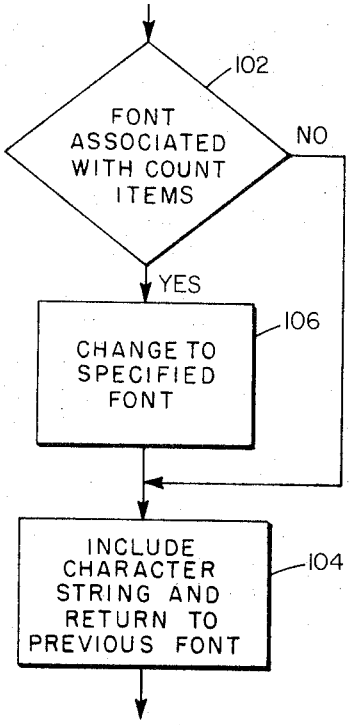
Figure 6:
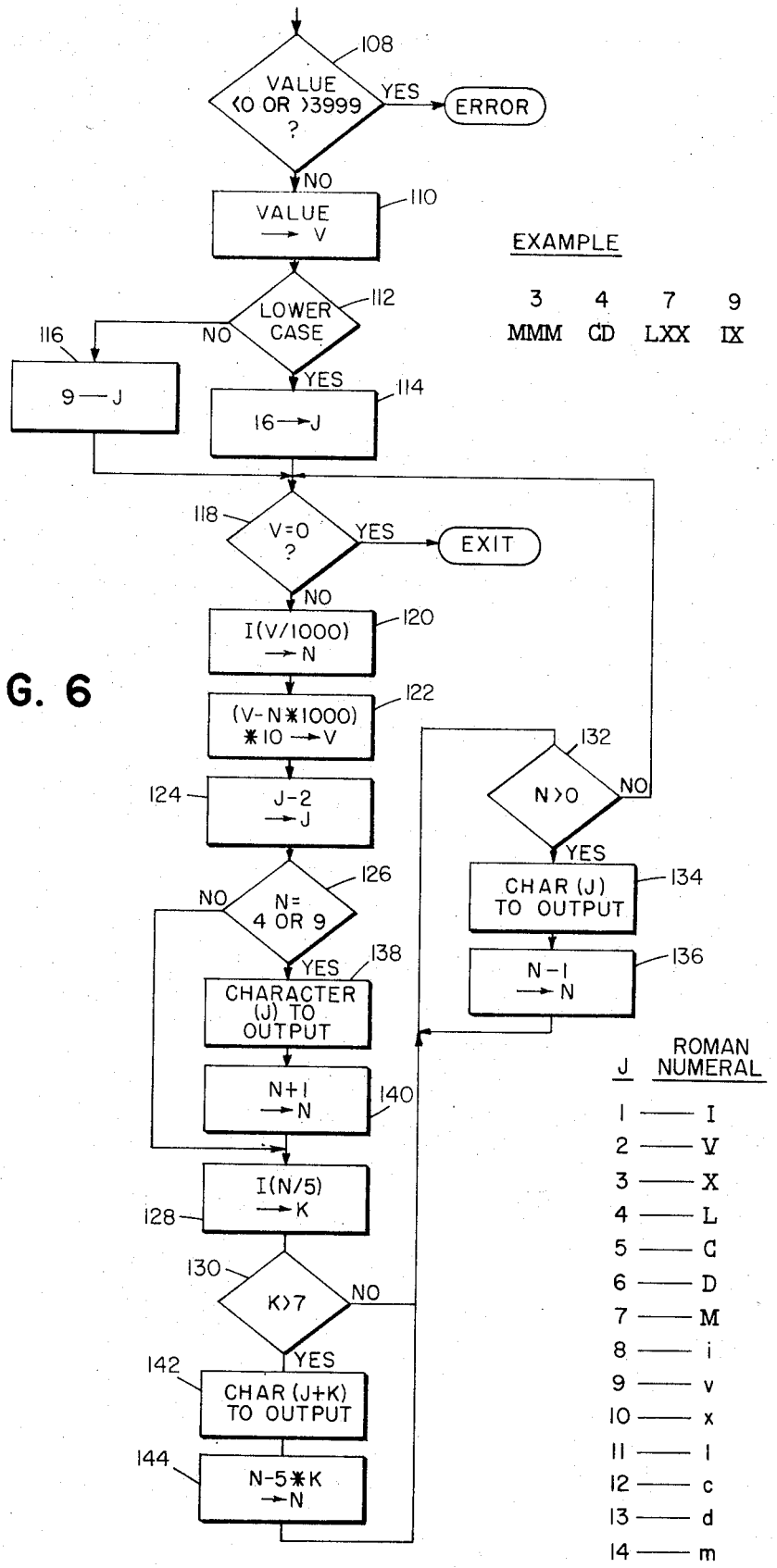

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 383

T915,003

COMPUTER PROGRAM FOR INTERPRETING SYMBOLIC LANGUAGE IN A TEXT STREAM

Henry T. Norton, Boulder, Colo., assignor to International Business Machines Corporation, Armonk, N.Y.

Continuation of abandoned application Ser. No. 99,938, Dec. 21, 1970. This application Oct. 6, 1972, Ser. No. 295,781

Int. Cl. G06f *9/00*

U.S. Cl. 444—1

5 Sheets Drawing. 35 Pages Specification

Sequences of graphic forms to be used in text composition are represented by symbolic sequence commands in

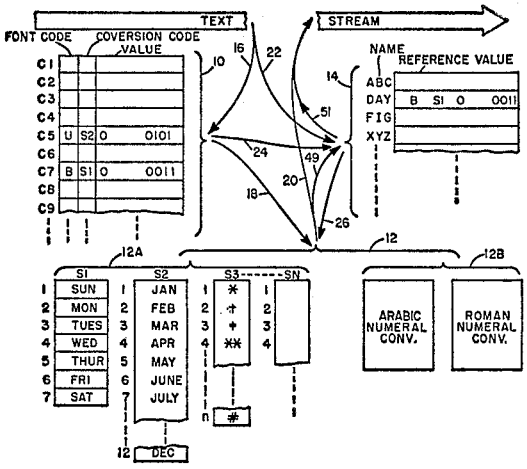

the text stream to be processed. The sequence commands are variable and are monitored by a data processing system under program control. Initially, a sequence command causes the data processing system to assign one storage location for sequence codes in that command. The

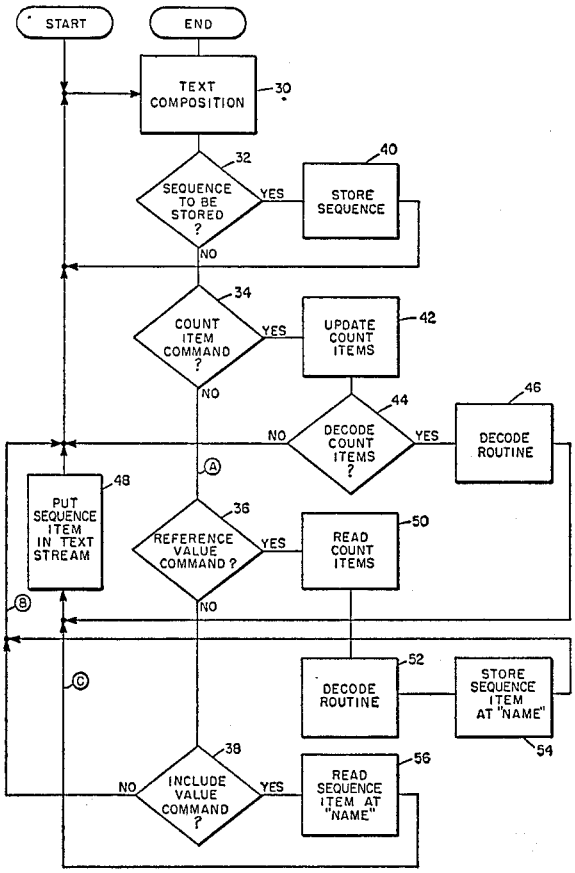

storage location is identified by a usage identifier in the sequence command. Thereafter, a sequence command containing that usage identifier will operate on codes in the assigned storage location. The usage identifier is indicative of a specific use of a sequence in the text stream, as for example, numbering figures or tables.

COMPUTER PROGRAM FOR INTERPRETING SYMBOLIC LANGUAGE IN A TEXT STREAM

Original Filed Dec. 21, 1970 5 Sheets-Sheet 1

INVENTOR
HENRY T. NORTON
BY H. L. Kneal
ATTORNEY